Figures 1, 2:
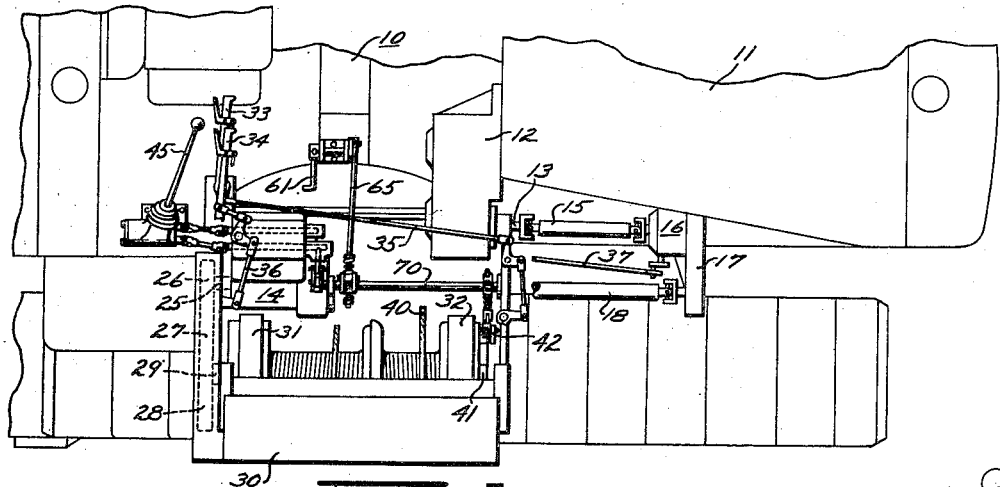

Dec. 11, 1956     N. M. ERDAHL     2,773,573

INTERLOCK MECHANISM

Filed Jan. 7, 1955

INVENTOR.
NICHOLAI M. ERDAHL
BY
*Fryer and Johnson*
ATTORNEYS

United States Patent Office 2,773,573
Patented Dec. 11, 1956

2,773,573

INTERLOCK MECHANISM

Nicholai M. Erdahl, Milwaukee, Wis., assignor to Caterpillar Tractor Co., Peoria, Ill., a corporation of California Application January 7, 1955, Serial No. 480,349

3 Claims. (Cl. 192—4)

This invention relates to an interlock device used in connection with shifting mechanism for a forward and reverse driving power transmission, and a releasable-pawl ratchet associated with a rotatable drum driven by the transmission.

It is common practice to provide a cable winding drum with a ratchet to prevent the cable from being unwound from the drum when the source of power used to rotate the drum is disengaged. When it is desired to drive the drum in a reverse direction to reel out the cable, it is imperative that the pawl be withdrawn from the ratchet before the power source is shifted into reverse drive to prevent breakage of the power transmission mechanism or parts of the ratchet device. Therefore, it is an object of this invention to provide an interlock between the shifting mechanism of a forward and reverse driving power transmission and a releasable-pawl ratchet, associated with a rotatable drum driven by the transmission, to prevent shifting of the transmision into reverse drive while the pawl is engaged with the ratchet.

In the drawings:

Fig. 1 is a plan view of a portion of a track-type tractor provided with a pair of cable winding drums showing the drive from a power take-off through a variable speed transmission to the drums. Also shown are some of the controls used in operating various mechanisms on the tractor, as well as the interlock device between the transmission and a ratchet on one of the drums, and Fig. 2 is a fragmentary perspective view, with parts broken away, of the power transmission and controls therefor, the rotatable drums driven by the transmission and the interlocking device and control.

In Fig. 1 a track-type tractor 10 is shown as having an engine disposed beneath a hood 11 and provided with a power take-off gear box 12 whose output shaft is indicated at 13. The power path from the power take-off 12 to a variable speed transmission 14 is through a propeller shaft 15, a master clutch 16 which may be of the friction type, then through a second gear gox 17 to a second propeller shaft, one end being shown at 18 and the other end being connected to an input shaft 19 (Fig. 2) of the speed-change transmission 14.

The transmission may be provided with speed-change gears (not shown) to drive an output shaft 25 at various speeds, and a reverse gear (not shown) to drive the output in a reverse direction. All of these gears may be of the sliding spur-gear type or may be of a constant-mesh type employing sliding-collar, positive-drive clutches to change gear ratios; the gears are of a conventional type and form no part of the invention.

Non-rotatably secured to the transmission output shaft is a sprocket 26 meshing with a drive chain 27 which rotates a second sprocket 28 secured to a drive shaft 29 supported for rotation within a housing 30. A pair of drums 31 and 32 adapted to receive cable are rotatably mounted by suitable bearings on the drive shaft 29, and each drum is provided with a selectively engageable clutch (not shown) to connect each single drum in a driven relationship to the drive shaft. Levers shown at 33 and 34 are provided with suitable linkage, generally indicated at 35 and 36, to control the drum clutches used to connect the drums in a driven relationship with the drive shaft 29. The master clutch 16 is also provided with a lever (not shown) and linkage, a portion of which is indicated at 37, to effect engagement and disengagement.

The cable 40 shown wound on the drum 32 may be used to control the raising and lowering of a boom (not shown) pivotally supported at one end on the tractor 10. Driving this drum 32 in a counterclockwise direction by means of the forward gears of the transmission 14 will wind the cable 40 around the drum to effect raising of the boom. In this description and the appended claims the term "forward," in relation to the transmission 14 and the drum 32, is used to indicate rotation of the output shaft 25 of the transmission and the drum 32 in a direction to effect winding in of the cable 40, and the term "reverse" is used to indicate rotation of the output shaft 25 and the drum 32 in a direction to effect unreeling of the cable 40. Although an automatically engageable brake may be associated with the drum to prevent clockwise rotation and lowering of the boom, as an additional safety measure it is advisable to provide a ratchet 41 on the drum 32 and a releasable pawl 42 to prevent clockwise rotation of the drum and lowering of the boom. The pawl 42 is pivotally supported on a shaft 43 mounted in a bracket 44 to allow selective engagement and withdrawal of the pawl.

Since the pawl must be withdrawn before the drum is driven in reverse to prevent damage to the transmission 14 and/or the ratchet 41, it is an object of this invention to provide a lock associated with the shifting mechanism of the transmission to prevent the transmission from being shifted into reverse drive while the pawl is engaged.

As shown in Fig. 2, a transmission control lever 45 is provided for selective engagement of the speed-change gears and the reverse gear. The control lever 45 may be connected in a conventional manner to shifting rails 50 and 51 slidably mounted in the transmission 14 and carrying shifting forks 52 and 53 which effect engagement of the various gears. In the transmission illustrated, the shift rail 50 controls engagement of a first speed and a second speed gear, while the shift rail shown at 51 controls the engagement of a third speed forward gear and a reverse drive gear by means of fork 53. To prevent the transmission from being shifted into reverse while the pawl 42 is engaged with the ratchet 41, a locking plunger 54 is disposed in piloting holes 55 and 56 provided in the transmission housing, and biased by means of a spring 57 between the housing and a shoulder 58 on the plunger 54. The plunger is shown in register with an elongated notch 59 provided in the shifting rail 51. Movement of this rail in the direction indicated by an arrow 60 will effect engagement of the reverse gear drive; movement of the rail in the opposite direction engages the third speed forward drive. The rail 51 is shown in a neutral position, with neither the third speed forward gear nor the reverse gear engaged in the power train. The elongated notch 59 will allow movement of rail 51 in a direction to engage the forward gear; however, the relative positions of the notch 59 and the plunger 54 will arrest movement in the direction indicated by the arrow 60 so that the reverse drive gear may not be engaged until the locking plunger 54 has been withdrawn.

An interlock mechanism to simultaneously withdraw the locking plunger 54 from the notch 59 and the pawl 42 from the ratchet is provided and comprises a manually operable crank 61 secured to one end of a shaft 62 supported in a mounting bracket 63 and having an arm 64 non-rotatably secured to the opposite end of the shaft 62. The arm 64 is loosely connected to a control rod 65 which extends through a hole in a pivot pin 66 rotatably mounted in an operating lever 67, and the rod 65 is biased by means of a pair of springs 68 and 69 on opposite sides of the pivot pin 66. The operating lever 67 is secured to a rock shaft 70 rotatably mounted in suitable supports, one of which is indicated at 71, and has a pawl control lever 72 secured to one end and a plunger control lever 73 secured at the other end. Links 74 may be provided between the plunger control lever 73 and the locking plunger 54 to prevent the plunger from cocking and to permit relatively free operation. The ratchet pawl 42 is connected to the pawl control lever 72 by means of a bifurcated rod 75 extending through a pivot pin 76 in the end of the pawl control lever and secured by a nut 77. The ratchet pawl may also be biased by means of a spring 78 to insure engagement and to prevent excessive vibration of the pawl 42 while it is engaged during rotation of the drum 32 in a counterclockwise direction.

The ratchet pawl 42 and the transmission locking plunger 54 as well as the interlock control mechanism is illustrated in the engaged position. To effect simultaneous withdrawal of the pawl and the locking plunger, the crank handle 61 is rocked in a clockwise direction, as viewed in Fig. 2, to a position 61a indicated by broken lines resulting in the operating lever 67 and the rock shaft 70 being turned in a counterclockwise direction and withdrawal of pawl 42 and plunger 54. The transmission 14 may now be shifted into reverse drive and the drum 32 freely rotated in a clockwise direction.

By rotating crank handle 61 in a counterclockwise direction, and returning it to the position illustrated, the pawl 42 and the locking plunger 54 are simultaneously engaged to prevent the transmission 14 from being shifted into reverse drive while the pawl is engaged.

I claim:

1. In shifting mechanism including forward and reverse gears for driving a rotatable drum, a ratchet on the drum, a pawl engageable with the ratchet to prevent reverse rotation thereof, locking means associated with the shifting mechanism to lock it against movement into reverse position, means connecting said pawl and locking means, and means operable through said connecting means to withdraw the pawl and release the locking means simultaneously.

2. In shifting mechanism including forward and reverse gears for driving a rotatable drum, a ratchet on the drum, a pawl engageable with the ratchet to prevent reverse rotation thereof, locking means associated with the shifting mechanism to lock it against movement into reverse position, resilient means normally holding both the ratchet and locking means in engaged position, and a manually operated control member connected with both the pawl and locking means for simultaneously releasing them.

3. In shifting mechanism including forward and reverse gears for driving a rotatable drum, a ratchet on the drum, a pawl engageable with the ratchet to prevent reverse rotation thereof, locking means associated with the shifting mechanism to lock it against movement into reverse position, means connecting said pawl and locking means, resilient means normally urging the pawl and locking means toward their engaged positions, and a manually operable control member associated with said connecting means for simultaneously moving the pawl and locking means to their disengaged positions.

References Cited in the file of this patent

UNITED STATES PATENTS

| | | |
|---|---|---|
| 770,521 | Fitzgerald | Sept. 20, 1904 |
| 902,559 | Coldwell | Nov. 3, 1908 |
| 1,907,858 | Neuberth | May 9, 1933 |
| 1,945,083 | Santos | Jan. 30, 1934 |
| 2,428,163 | Hubbard et al. | Sept. 30, 1947 |